(12) United States Patent
El Waffaoui

(10) Patent No.: US 8,687,395 B2
(45) Date of Patent: Apr. 1, 2014

(54) RECTIFIER AND HIGH EFFICIENCY CHARGE PUMP FOR RFID

(75) Inventor: Rachid El Waffaoui, Eindhoven (NL)

(73) Assignee: NXP B.V., Eindhoven (NL)

(*) Notice: Subject to any disclaimer, the term of this patent is extended or adjusted under 35 U.S.C. 154(b) by 350 days.

(21) Appl. No.: 13/219,492

(22) Filed: Aug. 26, 2011

(65) Prior Publication Data

US 2012/0049937 A1 Mar. 1, 2012

(30) Foreign Application Priority Data

Aug. 27, 2010 (EP) .................................... 10174356

(51) Int. Cl.
*H02M 7/217* (2006.01)

(52) U.S. Cl.
USPC ............................. 363/127; 327/427; 327/537

(58) Field of Classification Search
USPC ........ 363/59, 60, 65, 127; 327/427, 536, 537, 327/541
See application file for complete search history.

(56) References Cited

U.S. PATENT DOCUMENTS

| | | | |
|---|---|---|---|
| 7,741,898 B2* | 6/2010 | Hsu ................................ | 327/536 |
| 8,362,825 B2* | 1/2013 | Bergler et al. ................ | 327/536 |
| 8,405,450 B2* | 3/2013 | Ucciardello et al. .......... | 327/536 |
| 2005/0088220 A1* | 4/2005 | Hahn et al. .................... | 327/536 |
| 2005/0212586 A1* | 9/2005 | Daga et al. .................... | 327/536 |
| 2006/0132219 A1* | 6/2006 | Chen et al. .................... | 327/536 |
| 2009/0153232 A1* | 6/2009 | Fort et al. ...................... | 327/536 |
| 2011/0134674 A1* | 6/2011 | Ivanov .......................... | 363/127 |

FOREIGN PATENT DOCUMENTS

| | | |
|---|---|---|
| WO | 02/065380 A2 | 8/2002 |
| WO | 2009/047715 A1 | 4/2009 |
| WO | 2010/070603 A1 | 6/2010 |
| WO | 2 341 603 A1 | 7/2011 |

OTHER PUBLICATIONS

Maurath, D. et al. "High Efficiency, Low-Voltage and Self-Adjusting Charge Pump with Enhanced Impedance Matching", Circuits and Systems, MWSCAS IEEE, pp. 189-192 (Aug. 10, 2008).

Teh, Y.-K. et al. "Development of CMOS UHF RFID, Modulator and Demodulator Using DTMOST Techniques", ASIC 2009, IEEE 8th International Conf., pp. 561-564 (Dec. 11, 2009).

Extended European Search Report for Patent Appln. No. 10174356.6 (Feb. 2, 2011).

* cited by examiner

*Primary Examiner* — Adolf Berhane
*Assistant Examiner* — Lakaisha Jackson

(57) ABSTRACT

It is described a high efficiency rectification stage using dynamic threshold MOSFET. The idea is to use the input signal to reduce the threshold voltage when the transistor has to be on, and to increase the threshold when the transistor has to be off. This allows reducing both the resistive losses and the leakage current. A matching network allows the generation of a second higher voltage signal to drive the control gates and the bulk, i.e. the wells, of the transistors. Further, a self-tuned front-end is provided to extend the bandwidth of the high-Q charge pump.

10 Claims, 14 Drawing Sheets

RECTIFIER AND HIGH EFFICIENCY CHARGE PUMP FOR RFID

This application claims the priority under 35 U.S.C. §119 of European patent application no. 10174356.5, filed on Aug. 27, 2010, the contents of which are incorporated by reference herein.

FIELD OF THE INVENTION

The present invention relates to the field of rectifiers and charge pumps.

BACKGROUND OF THE INVENTION

RFID tag and reader systems may operate over a wide range of frequencies, including low-frequency (LF) applications, high-frequency (HF) applications, and ultra-high-frequency applications (UHF). LF applications typically operate from 125-148.5 kHz. HF applications typically operate at 13.56 MHz. UHF applications typically operate from 300 MHz to 3 GHz. The "read range" of an RFID tag and reader system is often defined as the distance from which a reader can communicate with a tag. Passive LF and HF applications offer very short read ranges, often requiring the RFID tag to be within 0.01 to 0.5 m of a reader for successful communication. Passive UHF applications typically offer longer read ranges, allowing RFID tags to be within 2 to 12 meters or more of a reader for successful communication. In this case, the maximum read range is mainly limited by the sensitivity of the charge pump defined as the minimum input RF power to the charge pump that is required to deliver the required DC power needed by tag digital and analog circuits. The read range can be improved by two means: (a) reducing the DC power dissipation in the tag circuits, and (b) boosting the efficiency of the charge pump, while still meeting the bandwidth requirement.

FIG. 16 schematically shows a known one stage charge pump 1 using the so-called threshold $V_T$ cancellation. The bias voltages 2 required by the main rectifiers M1 and M2 are generated by "auxiliary" charge pumps 3, which are supplied by the same RF AC input 4. Unlike the main rectifier, the auxiliary pumps M1, M2 have only capacitive load (the gates of M1 and M2); therefore their biasing is much less critical. The rectifier M1 is "on" when the ac-coupled input signal is negative, while rectifier M2 is on when the input signal is positive. Thus a DC output 5 is provided. The quality factor of the charge pump has to be constrained to about 10 at maximum in order to meet the bandwidth requirement of the application. The restricted quality factor results in a significant power loss in the rectifiers. Therefore, the charge pump shown in FIG. 15 has a moderate efficiency of about 35%.

In view of the above-described situation, there exists a need for an improved technique that enables a charge pump to have a high efficiency while substantially avoiding or at least reducing one or more of the above-identified problems.

SUMMARY OF THE INVENTION

This need may be met by the subject matter according to the independent claims. Advantageous embodiments of the herein disclosed subject matter are described by the dependent claims.

According to a first aspect of the invention there is provided a rectifier, comprising an AC input for receiving an AC input signal, a DC output, at least one transistor for providing a rectified output signal to the DC output wherein the transistor is a field effect transistor, and a threshold changing circuit coupled to the bulk of the transistor, the threshold changing circuit being adapted for electrically biasing the bulk of the transistor depending on the AC input signal to thereby change the voltage threshold of the transistor depending on the AC input signal. This allows for a dynamic adaption of the voltage threshold of the transistor to the AC input signal.

According to an embodiment, the transistor is a metal oxide semiconductor field effect transistor (MOSFET). The rectifier may comprise a single transistor the bulk of which is biased depending on the AC input signal. According to other embodiments, the rectifier comprises two or more such transistors. In such a case the embodiments and examples presented herein for one transistor may be applied to the other such transistors as well, either in an identical form or in different form among the two or more transistors.

According to an embodiment, the AC input is coupled to the source or the drain of the transistor. In this regard and generally herein "coupling" includes directly electrically connecting, connecting via other elements, etc.

According to a further embodiment of the first aspect, the threshold changing circuit is configured to set the voltage threshold of the transistor to a low value in case the transistor has to be on and to set the voltage threshold of the transistor to a high value in case the transistor has to be off. As a consequence, if the transistor is on and the threshold voltage is set to a low value, the resistive losses may be reduced. On the other hand, if the transistor is off and the threshold value is set to a high value, the leakage of the transistor may be reduced.

It should be understood that the condition where the transistor "has to be on or off" is to be interpreted according to the required operation of the transistor for providing rectification of the AC input signal. For example, if the transistor under consideration is provided for switching a positive half wave to the output, the transistor has to be on as long as the positive half wave is received at the AC input.

According to a further embodiment of the first aspect, a matching circuit is provided, the matching circuit having a power input for receiving input power; a first matching circuit output coupled to the AC input, the first matching circuit output providing, in response to the received input power, a first voltage; and a second matching circuit output coupled to at least one of a gate of the transistor and the bulk of the transistor, the second matching circuit output providing, in response to the received input power, a second voltage; wherein the matching circuit is configured such that the magnitude of the second voltage is higher than the magnitude of the first voltage.

According to an embodiment, the input power is received by power input from an antenna, e.g. from a dipole. According to a further embodiment, the second matching circuit output is coupled to a gate of the transistor as well as to the bulk of the transistor. In other embodiments, the second matching circuit output is coupled only to the gate of the transistor. According to a still further embodiment, the second matching circuit output is coupled only the bulk of the transistor. Anyway, the matching circuit allows for adapting the voltage that is provided to (or towards) the gate and/or the bulk of the transistor with regard to the voltage that is provided by to (or towards) the source or drain of the transistor. In this regard it is mentioned that again "coupling" includes coupling via other elements. For example, according to an embodiment the voltage provided at the second matching output is coupled to the bulk of the transistor via a capacitor.

According to a further embodiment of the first aspect, the matching circuit further comprises: a first matching coil coupled between the power input and the AC input; and a second matching coil coupled to the AC input and providing the second voltage; wherein the first matching coil and the second matching coil are located with respect to each other such that an electromagnetic field produced by the first matching coil couples to the second matching coil to thereby increase the second voltage at the second matching circuit output compared to the first voltage at the first matching circuit output.

The realization of the matching circuit with the first matching coil and the second matching coil provides a simple and cost efficient implementation of this aspect. According to an embodiment, one matching coil or each of both matching coils may be realized by a slot in a conductive material. Further, according to an embodiment, one matching coil or both matching coils may be provided on chip or, in another embodiment, as part of an antenna. The latter embodiment may be suitable in particular in an RFID application.

According to a further embodiment, the rectifier comprises a switching element coupled between the first matching circuit output and the second matching circuit output for selectively electrically connecting the first matching circuit output and the second matching circuit output. This switching element allows for short circuiting in certain cases. For example, during a write operation in an RFID tag the signals provided on the two matching circuit outputs may be out of phase. In such a case, the switching element allows forcing both signals into phase by electrically connecting both matching circuit outputs.

According to a second aspect of the herein disclosed subject matter, a charge pump device is provided, wherein the charge pump device comprises at least one rectifier according to the first aspect or an example or embodiment thereof.

According to an embodiment of the second aspect, the charge pump device further comprises: a variable capacitance unit for providing a capacitance tuning the imaginary part of the input impedance of the charge pump device. In an embodiment, the variable capacitance unit is provided by a capacitor bank. In an embodiment, a respective capacitance is selected out of the capacitance bank by appropriate input signals to the capacitance bank.

The real part of the input impedance of the charge pump may be adjusted by an adjustable resistor in an embodiment.

According to a further embodiment, the charge pump device further comprises a tuning circuit for tuning the capacitance provided by the variable capacitance unit to a value that provides a maximum input power to the charge pump device. The maximum input power may be an absolute maximum or at least a local maximum. According to an embodiment, the tuning circuit changes the capacitance provided by the variable capacitance unit and monitors the input power to the charge pump device. For example, according to an embodiment, the tuning circuit may employ a gradient search. In an embodiment, such a gradient search may be employed by increasing the capacitance in a first step and maintaining the increased capacitance if the input power to the charge pump device based on the increased capacitance is higher than the previous input power to the charge pump device. Alternatively or additionally to tuning the imaginary part of the input impedance of the charge pump device, the bias voltages to the gates of the main rectifiers is tuned to provide a maximum input power. This is done by changing the conduction angle of the rectifier. As a result, the real part of the input impedance can be tuned as well by changing the gate voltage of the rectifier.

According to a third aspect of the herein disclosed subject matter a wireless identification device (RFID-device) is provided, the RFID device comprising a charge pump device according to the second aspect or an example or embodiment thereof. By employing a charge pump according to the second aspect or examples and/or embodiments thereof to a RFID device, higher output voltages of the charge pump may be achieved at the same input power level or sufficient output voltages may be achieved with even reduced input power levels. Hence, the RFID read range of an RFID tag may be increased without altering the power of the RFID reader.

According to a fourth aspect of the herein disclosed subject matter a method of operating a charge pump device comprising a rectifier with a transistor in the form of a field effect transistor is provided, the method comprising electrically biasing the bulk of the transistor depending on an AC input signal to the rectifier to thereby change the voltage threshold of the transistor depending on the AC input signal. This allows for a dynamic adaption of the voltage threshold of the transistor to the AC input signal. In particular, if the voltage threshold of the transistor is set to a low value in case the transistor has to be on and to a high value in case the transistor has to be off, resistive losses and leakage losses of the transistor may be reduced.

According to an embodiment of the fourth aspect, the method comprises providing a first voltage to be switched by the transistor to a source/drain of the transistor; and providing a second voltage, which is higher than the first voltage, to at least one of a gate of the transistor and the bulk of the transistor. In this way, sufficient biasing of the bulk of the transistor is achieved even for low AC input voltages.

According to an embodiment of the fourth aspect, the method comprises automatically tuning at least the imaginary part of the input impedance of the charge pump device so as to provide a maximum output voltage of the charge pump. By such a self-tuning of the charge pump, a high bandwidth may provided by the RFID device while also the Q factor of the charge pump need not to be limited. Higher Q factor helps to improve the power conversion efficiency (PCE) of the charge pump.

In the above there have been described and in the following there will be described exemplary embodiments of the subject matter disclosed herein with reference to a rectifier, a charge pump, a wireless device such as a RFID device and a method for operating a charge pump device. It has to be pointed out that of course any combination of features relating to different aspects of the herein disclosed subject matter is also possible. In particular, some embodiments have been described with reference to apparatus type claims whereas other embodiments have been described with reference to method type claims. However, a person skilled in the art will gather from the above and the following description that, unless other notified, in addition to any combination of features belonging to one aspect also any combination between features relating to different aspects or embodiments, for example even between features of the apparatus type claims and features of the method type claims is considered to be disclosed with this application.

The aspects and embodiments defined above and further aspects and embodiments of the present invention are apparent from the examples to be described hereinafter and are explained with reference to the drawings, but to which the invention is not limited.

DETAILED DESCRIPTION

Figure 1:
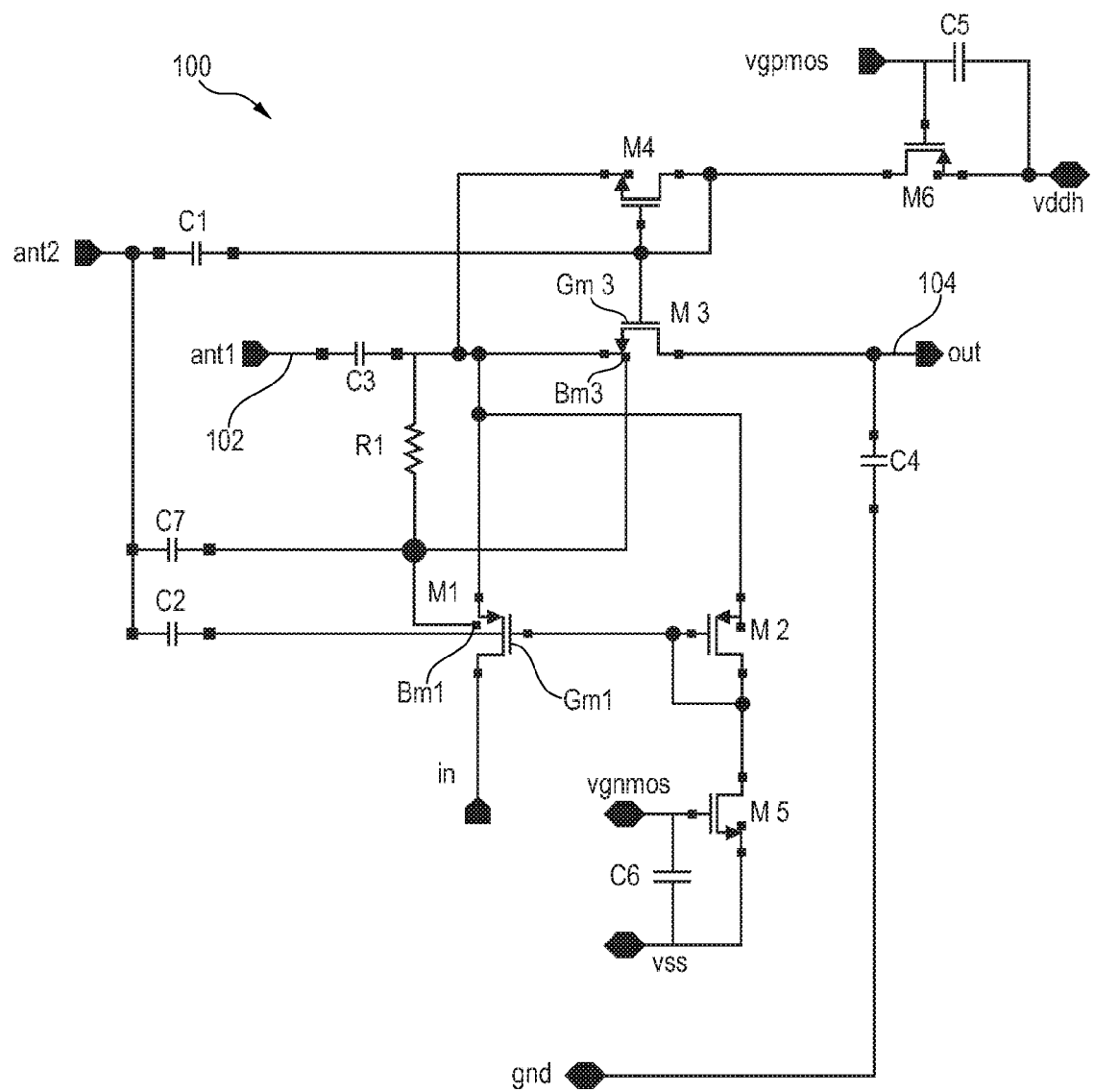
FIG. 1 shows a rectifier according to embodiments of the herein disclosed subject matter.

The illustration in the drawings is schematic. It is noted that in different figures, similar or identical elements are provided with the same reference signs.

In the following, aspects, examples and embodiments of the herein disclosed subject matter are illustrated for the exemplary use case of an RFID tag. With measures described herein, the efficiency of the charge pump can in particular be increased by operating the charge pump at a higher quality factor, while still meeting the bandwidth requirement using a novel self-tuning scheme to extend the bandwidth of the high-Q charge pump.

Key features of embodiments of the herein disclosed subject matter are:

A high efficiency pMOSFET/nMOSFET rectification stage using dynamic threshold MOSFET. The idea is to use the input signal to reduce the threshold voltage when the transistor has to be on, and to increase the threshold when the transistor has to be off. This allows reducing both the resistive losses and the leakage current.

A new auto-transformer based matching network allowing the generation of a second higher voltage signal to drive the control gates and the bulk (i.e. the wells) of the transistors.

A self-tuned front-end to extend the bandwidth of the high-Q charge pump.

When combining the above mentioned features, the efficiency of the charge pump can be boosted from 35% to 60%.

It is noted that although above and in the following it is referred to a RFID tag, the embodiments, examples and statements are also applicable to the general concept defined in the claims.

In order to boost the efficiency of a CMOS rectifier, it is proposed in accordance with an embodiment to dynamically modulate the bulk of the MOS transistor (known as DTMOS) using a higher input voltage in order to reduce the voltage threshold $V_T$ when the MOS transistor has to be on, and increase the voltage threshold $V_T$ when the MOS transistor has to be off. This allows reducing the resistive losses in the "on-mode" and the leakage current in "off-mode". Equation (1) shows the dependency of the threshold voltage on the bulk-source voltage $V_{bs}$. The gate voltage of a DTMOS has to be limited to approximately one diode voltage (~0.7 V at room temperature), otherwise large body-to-source/drain junction capacitances $C_{bs}/C_{bd}$ and currents will result. Large capacitances $C_{bd}$ and $C_{bs}$ will degrade the switching speed of transistor.

$$\Delta V_T = \gamma \left[ \sqrt{2\phi_f + V_{SB}} - \sqrt{2\phi_f} \right] \quad (1)$$

Where $\phi_f$ is the surface potential at strong inversion and $\gamma$ is the bulk threshold parameter. $V_{SB}$ is the bulk-source voltage.

FIG. 1 shows the schematic of pMOSFET/nMOSFET rectifier 100 with dynamic threshold modulation. The rectifier 100 includes an AC input 102 (ant1) and a DC output 104. The main rectifier 100 consists of M1 and M3 transistors provided for providing a rectified output signal to the DC output 104. The remaining components are for biasing. M5 and M6 are two current sources whose gates are controlled by the bias generator shown in FIG. 6. These two current sources are used to bias the diodes M2 and M4. The voltage drops on these two diodes serve to bias the rectifiers M1 and M3 respectively. By simply changing the current flowing in M2 and M4 diodes the conduction angles of M1 and M3 can be changed. The resistor R1 provides to the bulk a DC bias that is equal to the source DC bias. Capacitors C4, C3, and C6 are decoupling capacitors. Capacitors C1, C2, C3, and C7 are AC coupling capacitors. The DC bias voltage for the bulk of the transistors M1, M3 is equal to the source voltage. The bulk has however a higher inphase AC signal. The transistor M3 is on when the input signal 102 is positive. The bulk to the source voltage $V_{SB}$, is negative resulting in lower a threshold voltage according to equation (1). On the other hand, the M3 is off when the input signal 102 is negative. In this case, the bulk to the source voltage $V_{SB}$, is positive resulting in a higher threshold voltage according to the same equation (1). The same happens to M1 except that M1 is on when the input signal 102 is negative, and is off when the input signal 102 is positive.

Each transistor M1, M3 has a respective gate GM1, GM2 and a bulk (well) BM1, BM2. Port ant2 is only connected to the gates and the wells of the transistors M1, M3. This requires of course a process with isolated nMOSFET transistors with deep well layer (Dnwell). The Dnwell is connected to the highest voltage in the circuit. Another option is to make use of SOI technology to guarantee electrical isolation between the bulks of the transistors.

Figure 2:
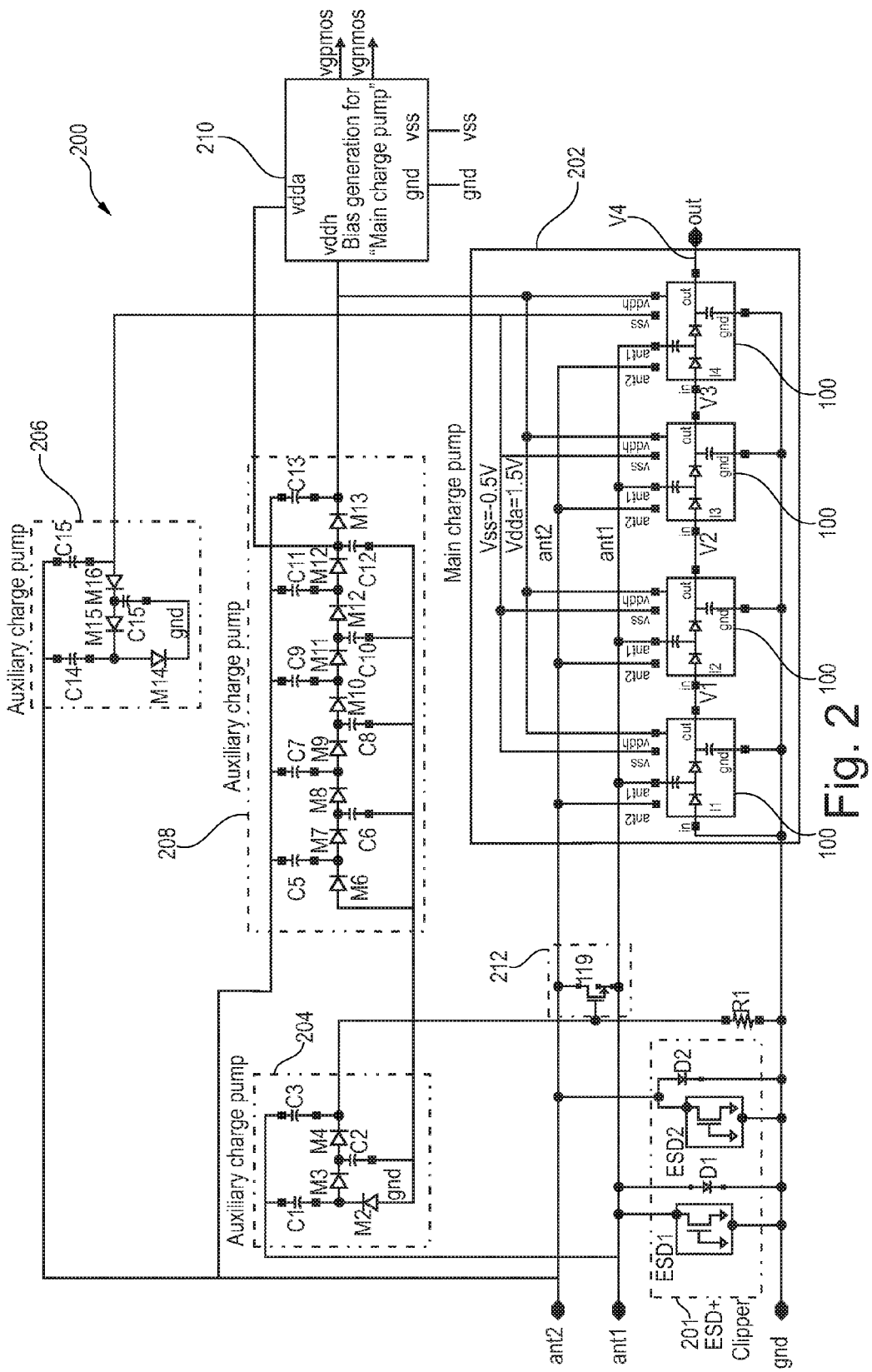
FIG. 2 shows a charge pump device according to embodiments of the herein disclosed subject matter.

FIG. 2 shows a charge pump device 200 according to embodiments of the herein disclosed subject matter. The charge pump device 200 includes a four stages main charge pump 202. Further, the charge pump device 200 includes electrostatic discharge (ESD) and clipping device 201 including protections ESD1, ESD2 and input limiters D1, D2. Further, the charge pump device 200 includes a first auxiliary charge pump 204, a second auxiliary charge pump 206, a third auxiliary charge pump 208, and a bias generator 210. The main charge pump consists of four pMOSFET/pMOSFET rectifiers 100 of the type described in FIG. 1. The individual rectifiers are indicated at I1 to I4 in FIG. 2. Since the transistors M1, M3 in FIG. 1 are operated to function as diodes, these transistors are depicted as diodes in FIG. 2 to increase readability of FIG. 2.

At high power mode, the bulk/drain $C_{bd}$ and the bulk/source $C_{bs}$ capacitances increase significantly, introducing phase shift between ant1 and ant2 inputs. In order to guarantee the operation of the circuit in the high power mode, a shorting device 212 is provided. The shorting device includes a switch MS is used to short circuit the ant1 and ant2 inputs in this mode. The switch MS should be off in the low power mode or read mode of the RFID tag. The resistor R1 allows the gate of the switch MS to be discharged if it is accidentally charged to a high voltage in the low power mode.

Figure 3:
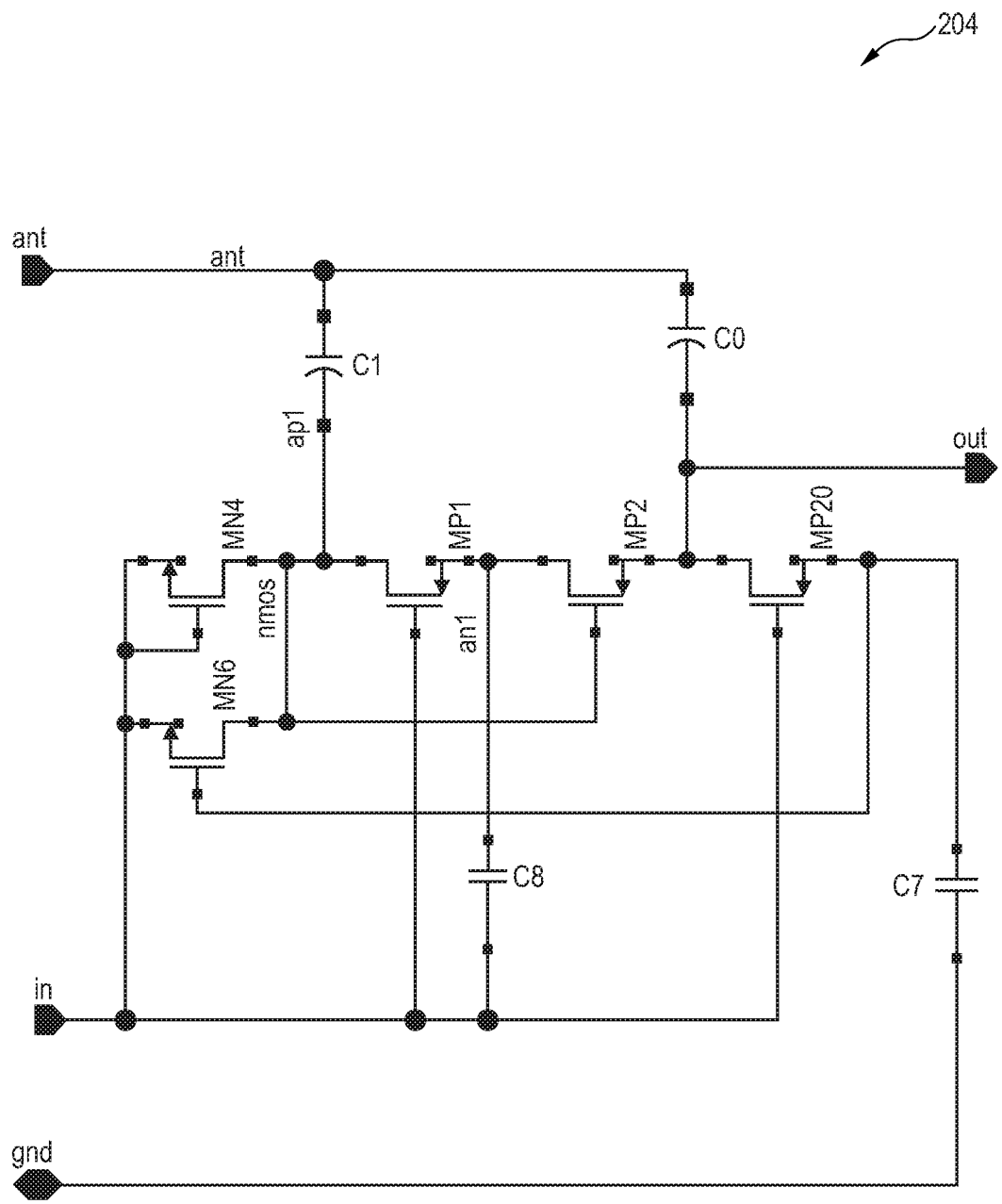
FIG. 3 shows the first auxiliary charge pump of FIG. 2 in greater detail.

The gate voltage for the switch MS of the shorting device 212 is generated using the first auxiliary charge pump 204 consisting of one and half rectification stages which is shown in greater detail in FIG. 3. The first stage consists of MN4, MN6, MP1, C1 and C8. The other half stage consists of MP2 and C0. MP20 and C7 generate the DC bias for MN6. The reason behind using one and half rectification stages to bias the switch MS is that the gate and the source of MS have now the same AC signal. This guarantees that the switch says off in the low power mode. In the high power mode however, the DC gate voltage of MS is much higher than the source voltage forcing the switch in the "on" state.

Figure 4:
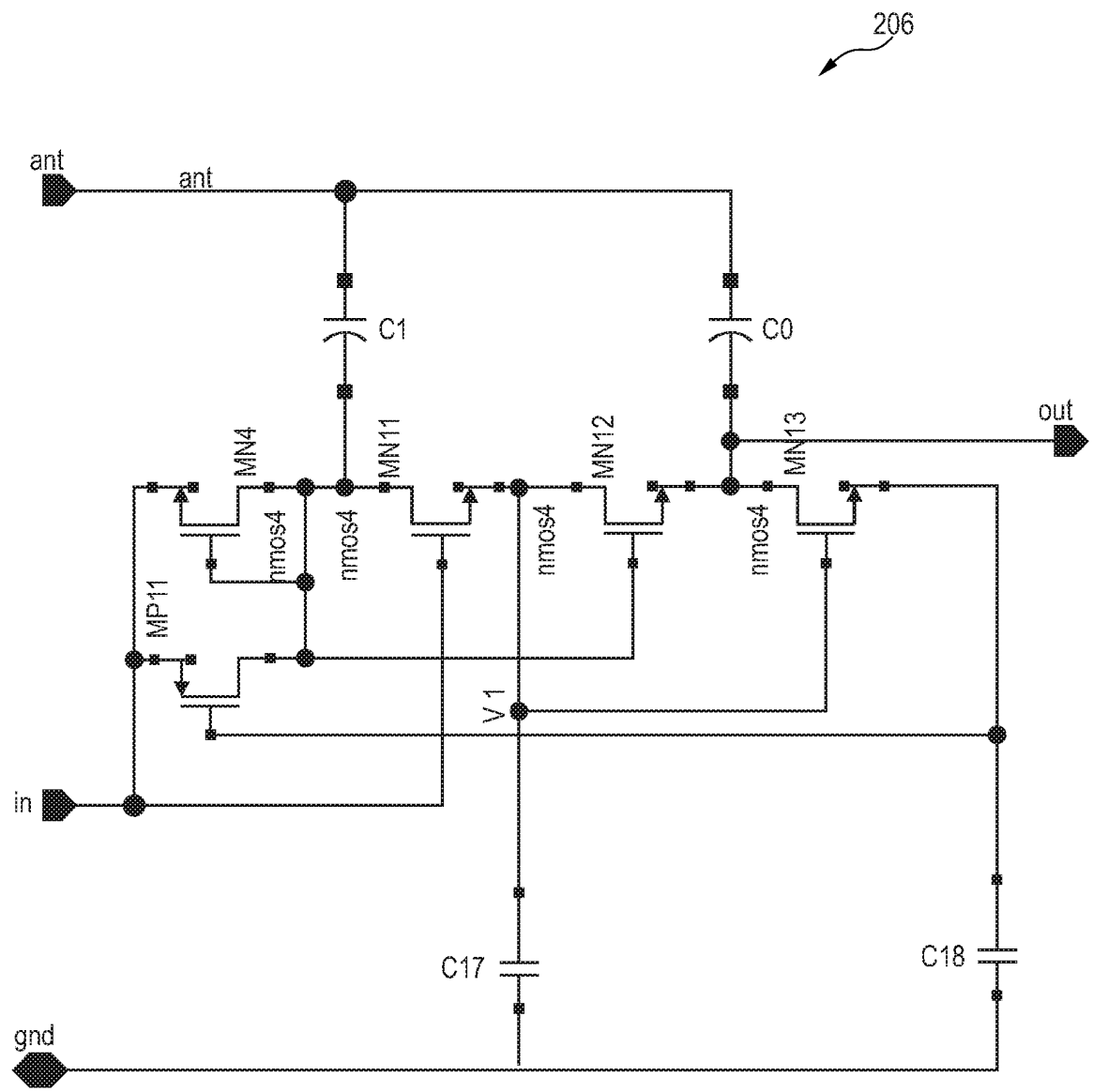
FIG. 4 shows the second auxiliary charge pump of FIG. 2 in greater detail.
Figure 5:
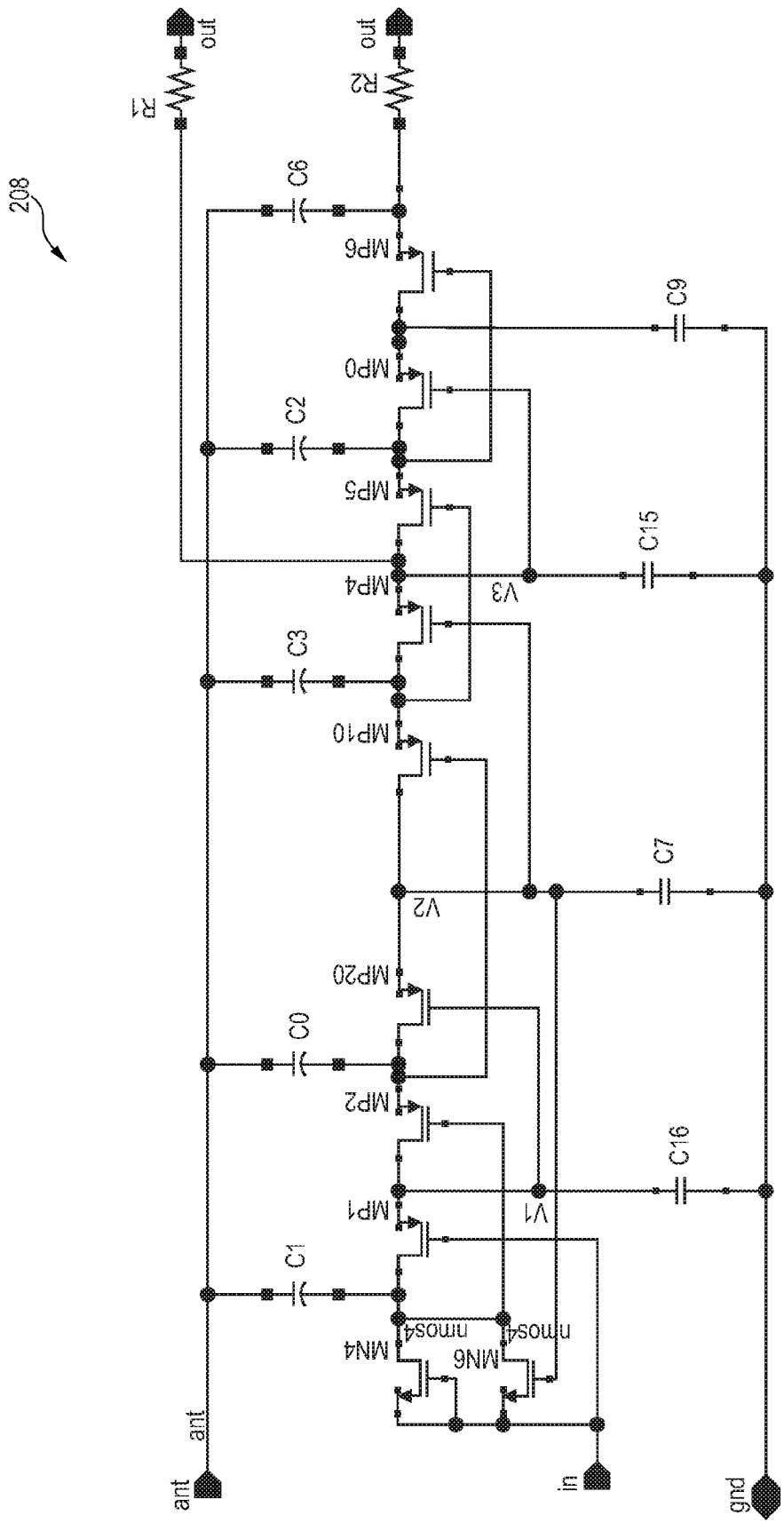
FIG. 5 shows the third auxiliary charge pump of FIG. 2 in greater detail.

The second auxiliary charge pump 206 and third auxiliary charge pump 208, which are shown in greater detail in FIG. 4 and FIG. 5, respectively, are used to generate two DC voltages $V_{vss}=-0.5V$ and $V_{vddh}=1.5V$ needed to provide sufficient voltage headroom for the current sources M5 and M6 of FIG. 1. The charge pump 206 consists of one and half rectification stages. The first stage consists of MN4, MP11, MN11, C1 and C17. The other half stage consists of MN12 and C0. MN13 and C18 provide the bias voltage for MP11. This charge pump is used as a supply voltage vss for the current source M5 in FIG. 1. The drain and the source of M5 have the same AC component, making the current flowing through M5 AC signal independent.

The charge pump 208 has two outputs. The first output has three rectification stages and is used as a supply voltage for the bias generator shown in FIG. 6. The second output has four and half rectification stages and is used as a supply for the current source M6 in FIG. 1. The drain and the source of this current source have the same AC component, making the current flowing through M6 AC signal independent.

Figure 6:
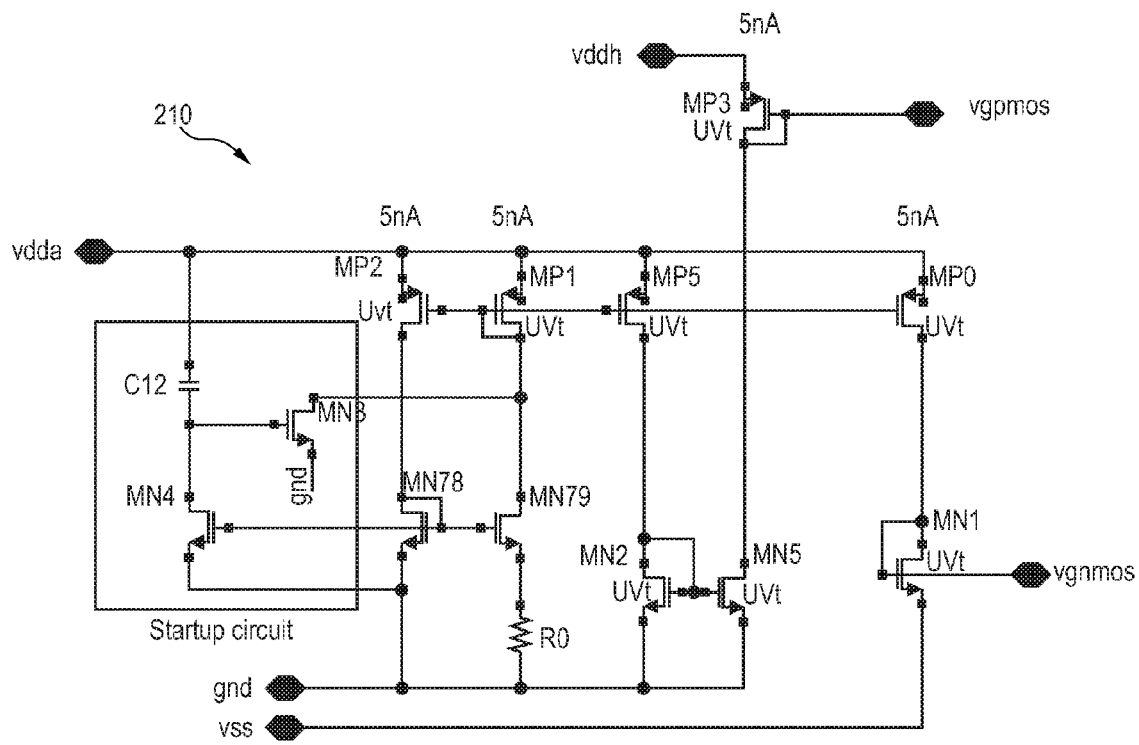
FIG. 6 shows the bias generator of FIG. 2 in greater detail.

The bias current for the rectifiers 100 is generated using the circuit shown in FIG. 6. To avoid start-up problems, this bias generator is powered using the third auxiliary charge pump 208. The main building blocks of this bias generator are:
 A ptat current source consisting of R0, MN78, MN79, MP2, and MP1.
 A Startup circuit consisting of MN4, MN3 and C12.
 The current mirrors MP5, MP0, MN2, MP3, MN5 and MN1.

By making the resistor R0 programmable, the reference current can be made tunable in order to tune the real part of the input impedance of the charge pump.

Figure 7:
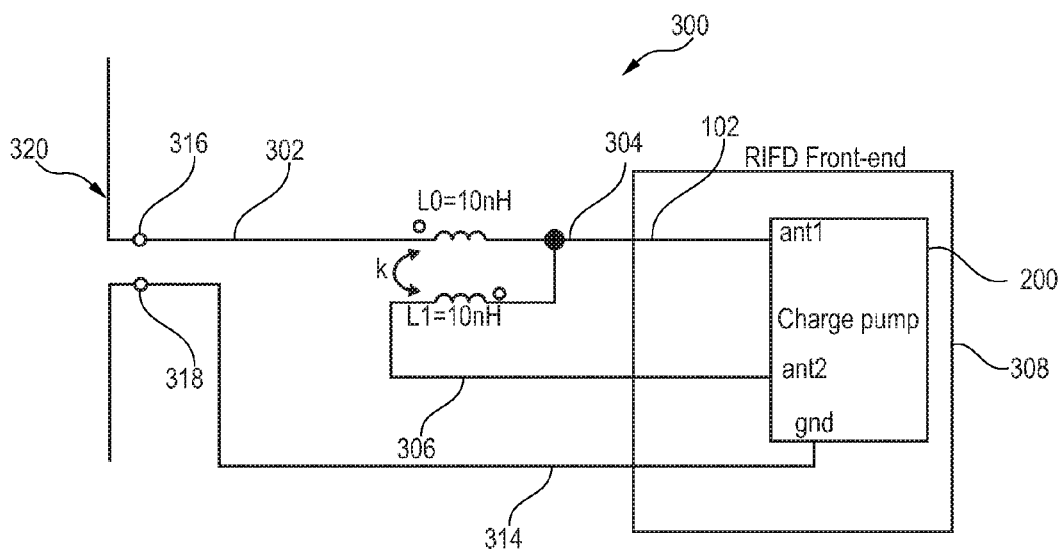
FIG. 7 shows a matching circuit according to embodiments of the herein disclosed subject matter.

FIG. 7 shows a schematic of a matching circuit 300 in the form of a matching network using an auto-transformer. The matching circuit 300 has a power input 302 for receiving input power. A first matching circuit output 304, ant1 is coupled, e.g. electrically connected, to the AC input 102 (see also FIG. 1). The first matching circuit output provides, in response to the received input power, a first voltage. A second matching circuit output 306, ant2 is coupled to at least one of a gate GM1, GM3 of the transistor M1, M3 and the bulk BM1, BM3 of the transistor M1, M3. The second matching circuit output 306 provides, in response to the received input power, a second voltage.

In accordance with an embodiment of the herein disclosed subject matter, the matching circuit is configured such that the magnitude of the second voltage is higher than the magnitude of the first voltage. To this end, according to an embodiment shown in FIG. 7, a second coil L1 is closely coupled, indicated by "k" in FIG. 7, to a first coil L0 to generate more voltage at the second matching circuit output 306, ant2 compared to the first matching circuit output 304, ant1. In accordance with an exemplary embodiment, further shown in FIG. 7 is an RFID front-end 308 to which the matching network 300 is connected. The RFID front-end 308 comprises a capacitor 310 connected between the first matching circuit output 304 and ground 314 and a capacitor 312 connected between the second matching circuit output 306 and ground 314. Further, the RFID front-end 308 includes the charge pump device 200 (see also FIG. 2). According to an embodiment shown in FIG. 7, the power input 302 and the ground 314 are connected to the output terminals 316, 318 of an antenna 320, e.g. a dipole.

As indicated in FIG. 7, according to an embodiment the inductance of the first coil L0 is equal to the inductance of the second coil L1 (L0=L1). According to other embodiments, the inductances L0, L1 are different.

The components involved in the threshold changing circuit according to embodiments of the herein disclosed subject matter are L0, L1 of FIG. 7, and M1, M3, C2, C3, C7, R1 of FIG. 1. However, as the skilled person is aware of, the embodiments shown in FIG. 1 and FIG. 7 are only exemplary and the respective functionality of a threshold changing circuit as described herein may as well be achieved by other circuits or other means.

Figure 8:
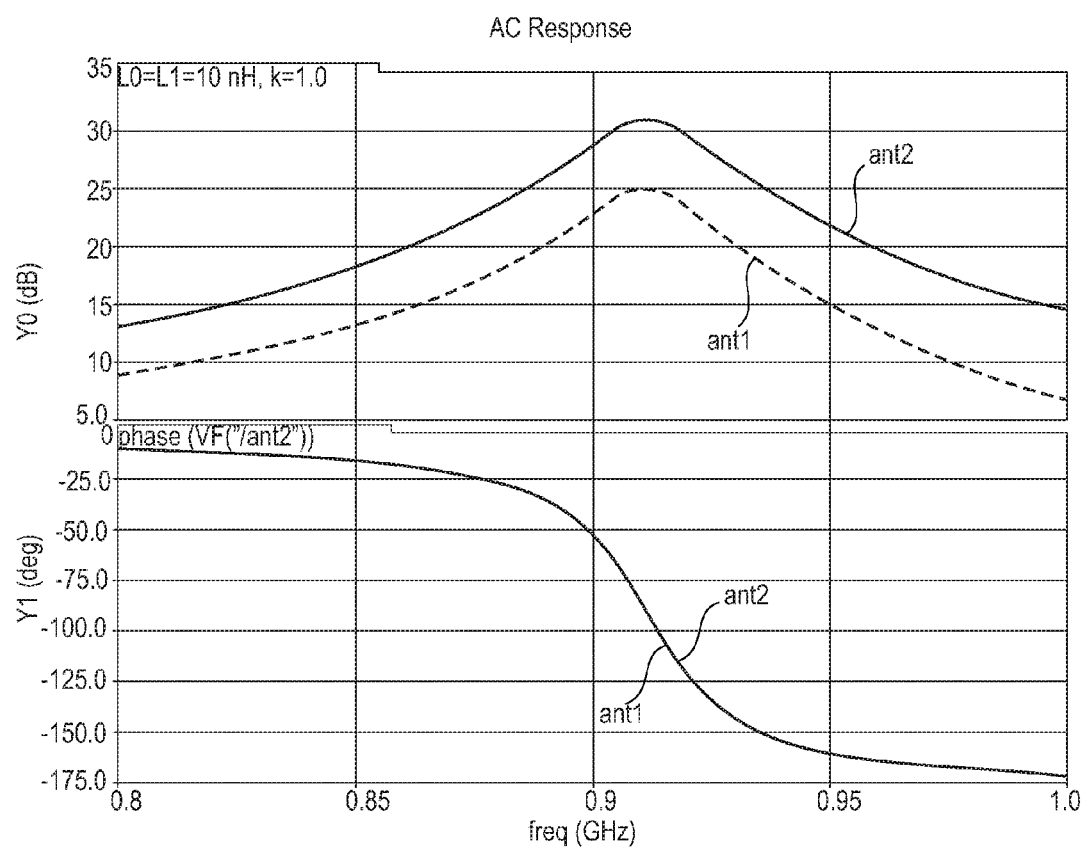
FIG. 8 shows the AC response of the matching circuit of FIG. 7 over frequency.

FIG. 8 shows a plot of the voltage ratio between ant2 and ant1. In the frequency band 850 MHz-950 MHz, the voltage at the ant2 port is 6 dB higher than the voltage at the port ant1, and the two signals are in-phase. According to an embodiment, the port ant2 will only be used to drive the gates and the bulks (wells) of the rectifiers 100. The remaining circuits such as the charge pump, modulator, and demodulator are connected, e.g. directly connected, to the ant1 port. The matching network 300 can be part of the antenna or be put on chip.

Figure 9:
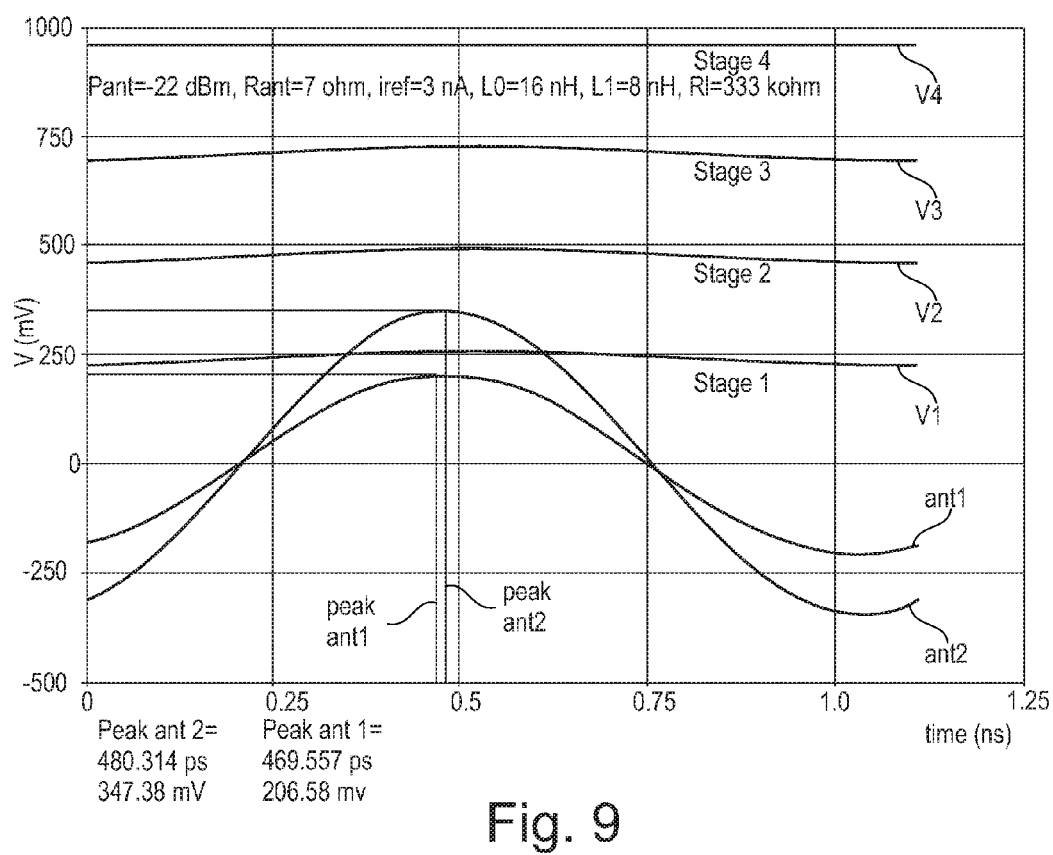
FIG. 9 shows the simulated input and output signals of the main rectifiers of the charge pump device in FIG. 2 for exemplary simulation parameters.

The complete charge pump has been simulated using a 160 nm process. FIG. 9 shows the input signals (ant1, ant2) and output signals (V1, V2, V3, V4: see also FIG. 2) of the main rectifiers 100 in millivolts (mV), coupled to the auto-transformer based matching network, over the time (in nanoseconds (ns)). FIG. 9 shows a periodic steady state response.

Simulation parameters have been:
Power of the antenna Pant=−22 dBm
Resistance of the antenna Rant=7 Ohm
Reference current Iref=3 nA
L0=16 nH (nano Henry)
L1=8 nH
R1=333 kOhm (see FIG. 1)

As can be taken from FIG. 9, the peak voltage of ant1=206 mV and the peak voltage of ant2=347 mV with a phase shift of about 10 picoseconds (ps) between the peaks. Further, each rectifier pushes the output voltage by about 240 mV, resulting approximately in V1=240 mV, V2=480 mV, V3=720 mV, V4=960 mV.

Figure 10:
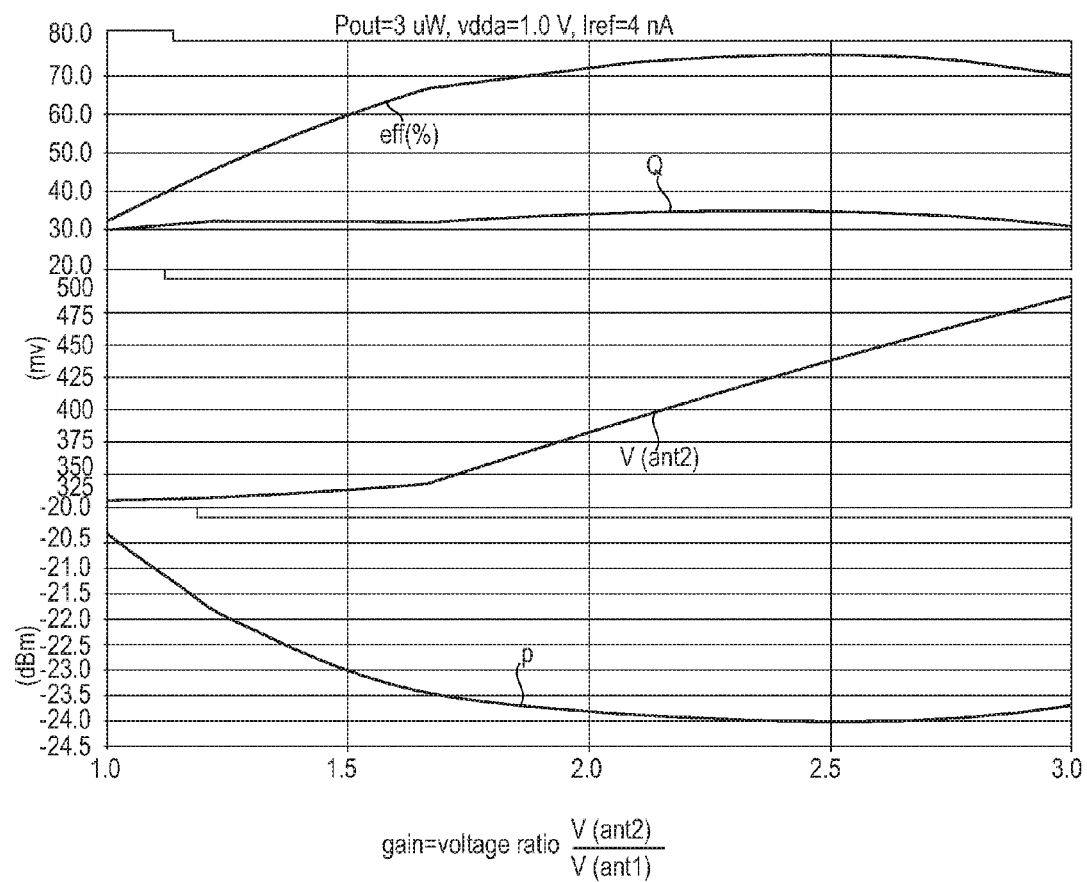
FIG. 10 shows the expected efficiency and quality factor over the voltage ratio V(ant2)/V(ant1).

FIG. 10 is a plot of the expected efficiency eff(%) and quality factor Q of the charge pump as a function of the voltage ratio voltage of ant2=V(ant2) to voltage of ant1=V (ant1). To achieve 60% efficiency, this voltage ratio has to be at least 1.6. The corresponding quality factor is around 30. Further shown in FIG. 10 is the voltage V(ant2) and the input power p to the charge pump. Simulation parameters for FIG. 10 have been: Output power Pout=3 μW, vdda=1.0, Iref=4 nA.

Figure 11:
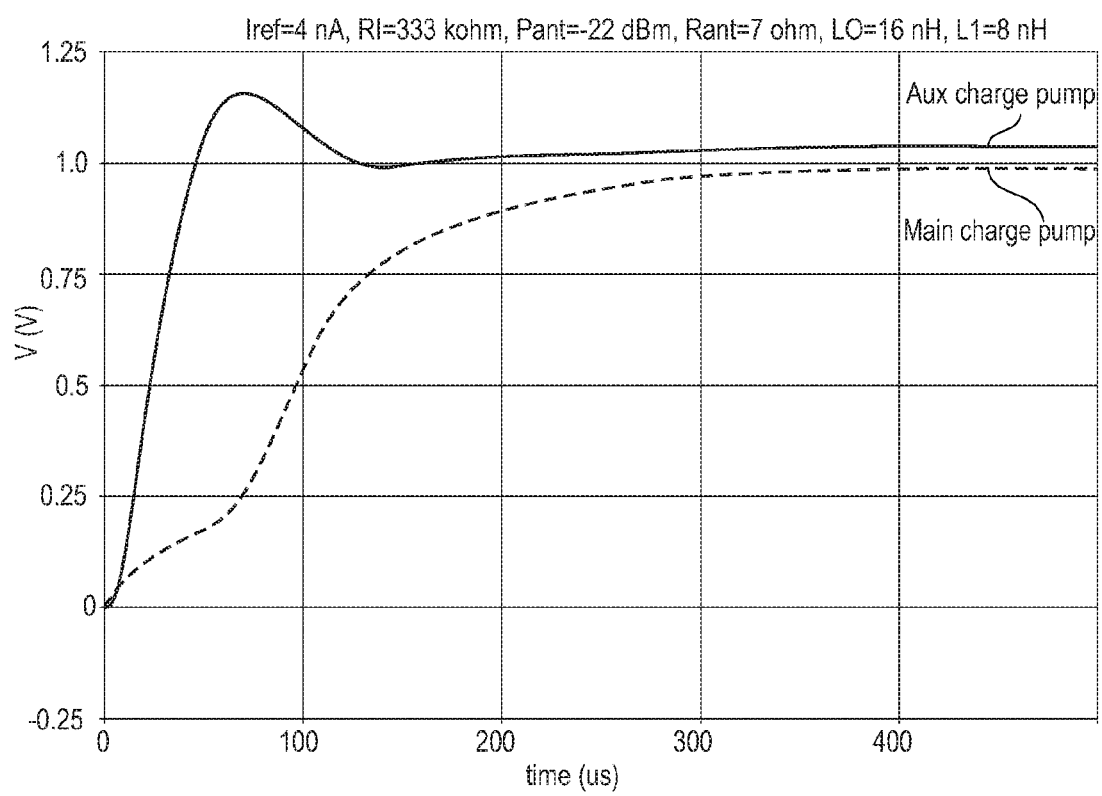
FIG. 11 shows the time evolution of the voltages at the output of a main charge pump and an auxiliary charge pump in accordance with embodiments of the herein disclosed subject matter.

The start-up time of the simulated charge pump device is shown in FIG. 11. To this end, the voltage at the output of the main charge pump 202 and the voltage of the first output of the third auxiliary charge pump 208 are shown over time in microseconds (μs). The settling time of the auxiliary charge pump is quite fast. The settling time of the main charge pump is less than 250 us and is mainly limited by the large load capacitance. Simulation parameters have been Iref=4 nA, R1=333 kOhm, Pant=−22 dBm, Rant=7 Ohm, L0=16 nH, L1=8 nH.

Figure 12:
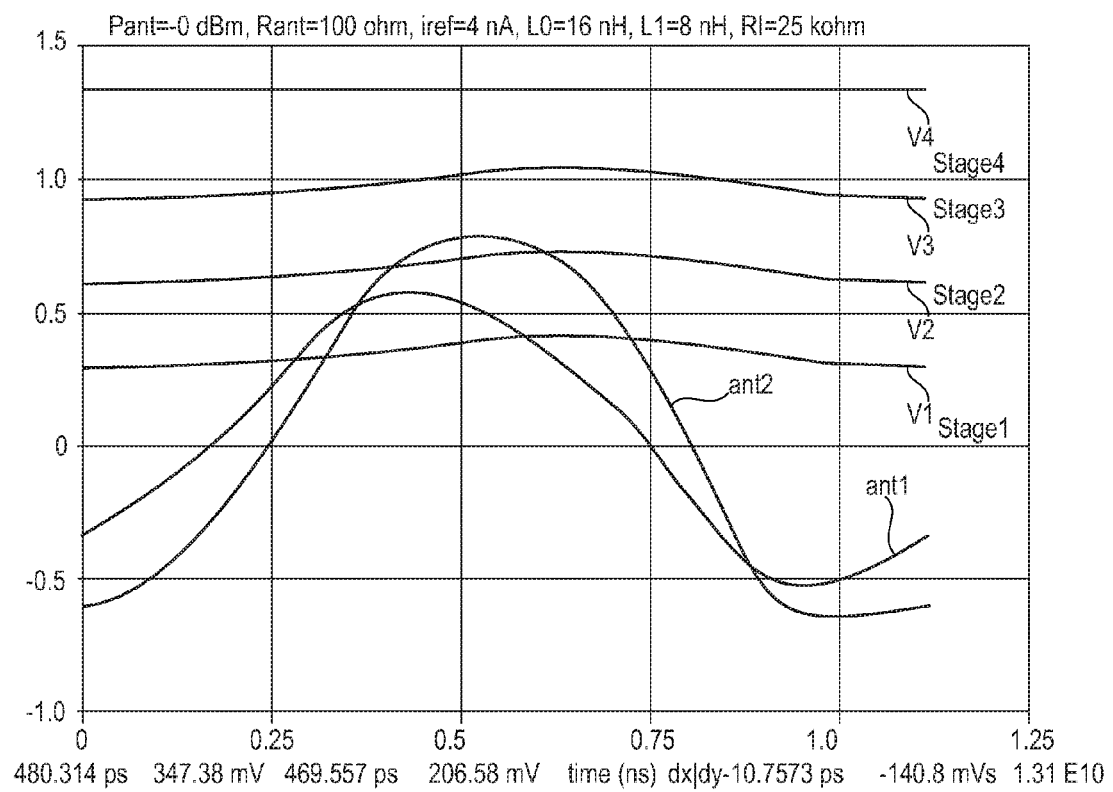
FIG. 12 shows the simulated input and output signals of the main rectifiers of the charge pump device in FIG. 2 for exemplary simulation parameters in a high power mode.

FIG. 12 shows the behaviour of the charge pump in the high power mode. As in FIG. 9, there are shown the input signals (ant1, ant2) and output signals (V1, V2, V3, V4: see also FIG. 2) of the main rectifiers 100 in volts (V), coupled to the auto-transformer based matching network, over the time (in nanoseconds (ns)). The ant1 and ant2 signal are forced to be in phase via the MS switch of FIG. 2. However, there remains a phase shift between ant1 and ant2.

Figure 13:
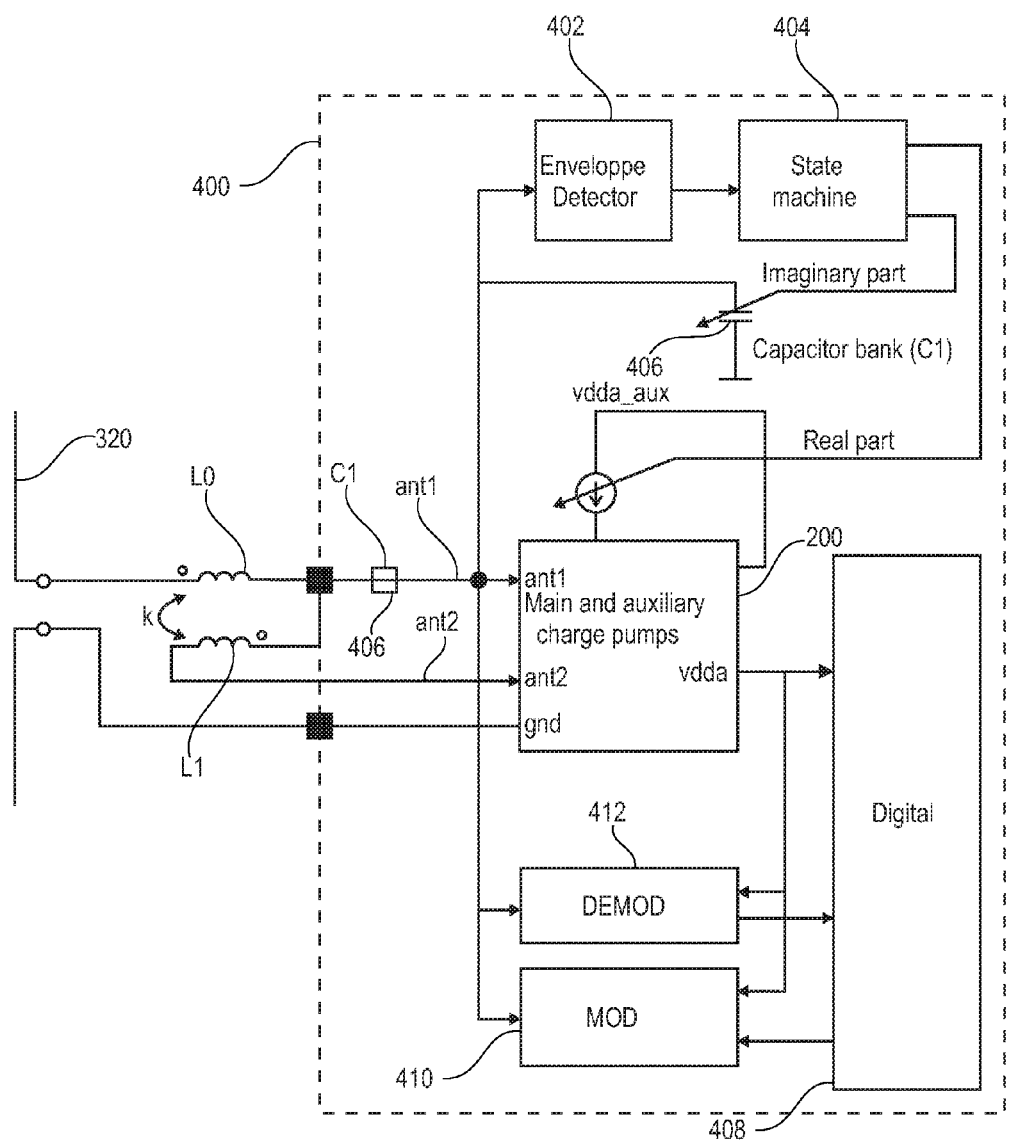
FIG. 13 shows a RFID tag integrated circuit embodying a self tuning scheme according to embodiments of the herein disclosed subject matter.

In order to extend the bandwidth of the charge pump, in particular at a higher quality factor disclosed herein, an embodiment of the herein disclosed subject matter uses the self-tuning scheme, an example of which is illustrated in the following. To this end, a tag integrated circuit (IC) 400 of an RFID tag is shown in FIG. 13. It consists of an envelope detector 402, a state machine 404 and a capacitor bank 406. According to an embodiment, the envelope detector 402 comprises a one rectifier stage. The state machine 404 is configured to tune both the real and the imaginary parts of the input impedance of the charge pump device 200 comprising in particular a main charge pump, e.g. main charge pump 202 of FIG. 2, and, optionally one or more auxiliary charge pumps. It should be understood that according to embodiments, one, two, or more auxiliary charge pumps may be provided in the charge pump device 200. For example, the first, second and third auxiliary charge pump 204, 206, 208 (see FIG. 2) may be included in the charge pump device 200. The imaginary part of the input impedance of the charge pump device 200 can be adjusted via the capacitors bank 406, while the real part can simply be set by tuning the value of the bias current via R0 of the bias generator 201 (see FIG. 6). According to an embodiment, the self-tuning is only activated at start-up and is turned off before activating the tag circuits, indicated at 408, 410 and 412 in FIG. 13. These tag circuits may be configured in any known way and are not discussed in further detail here.

Figure 14:
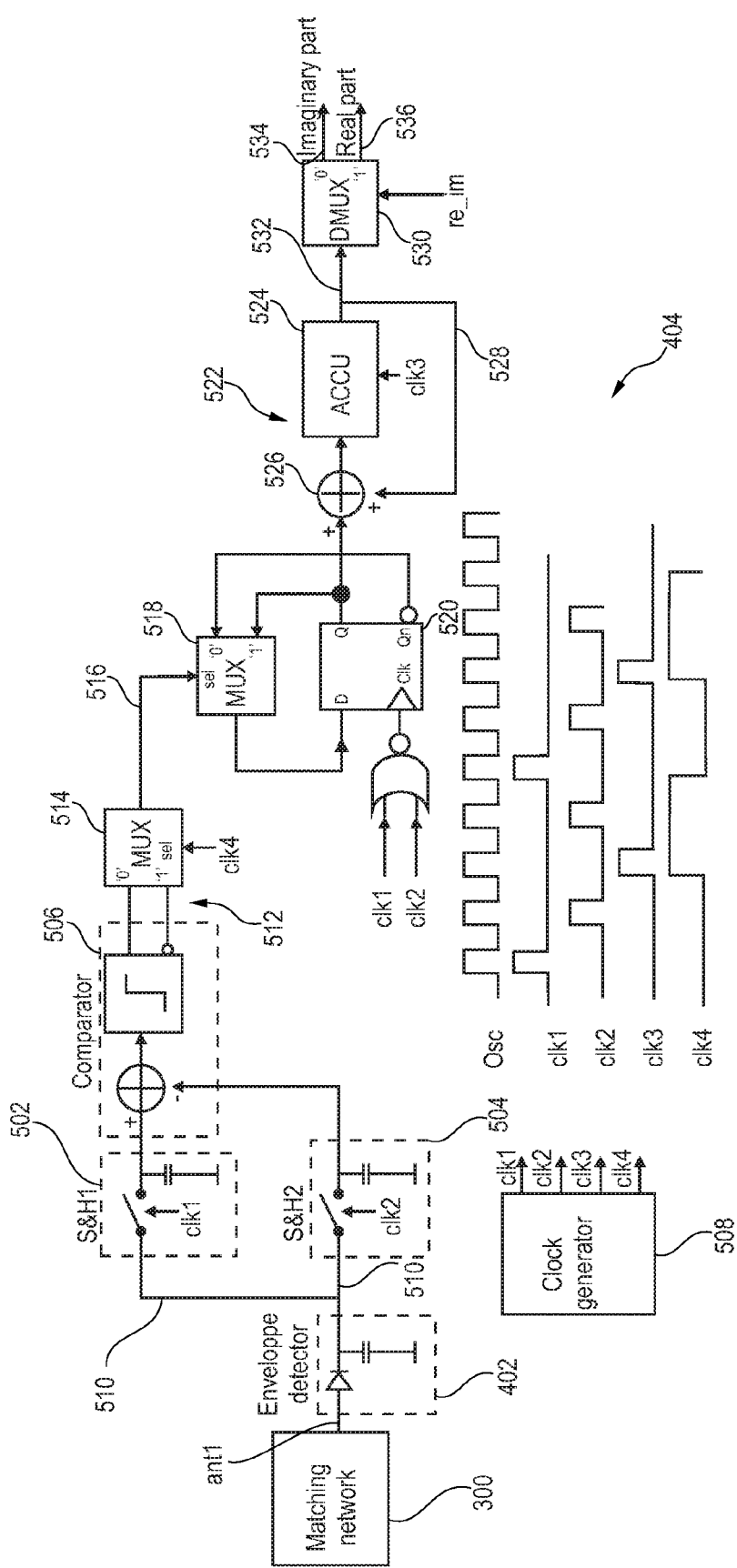
FIG. 14 shows an exemplary state machine for the self-tuning scheme of FIG. 13.

The functionality of the state machine 404 is described in further detail in FIG. 14. The state machine 404 consists of a first sample and hold circuit 502, a second sample and hold circuit 504, a comparator 506, a clock generator 508 and some logic which is described below. Further shown in FIG. 4 is a matching network 300 and the envelope detector 402. The matching network 300, which may include a capacitor bank and an antenna in an embodiment, provides an input signal ant1 to the envelope detector 402. The envelope detector 402 provides an output signal 510 that is related to the input power of the input signal ant1.

The state machine is based on a gradient search algorithm: It adjusts the value of the input capacitance and/or of the bias current in the rectifiers in order to maximize the input power to the charge pump. To this end, the two samples and holds circuits store two subsequent output signals 510 of the envelope detector 402. Sampling an output signal 510 by the first sample and hold circuit 502 is triggered by the first clock signal clk1 and sampling an output signal 510 by the second sample and hold circuit 504 is triggered by the second clock signal clk2. The two values hold in the sample and hold circuits 502, 504 are then compared by the comparator 506 which provides an output signal 512 to a mux element 514. Mux element 514 is triggered by clock clk4 and thereby takes into account whether the first sample and hold circuit 502 or the second sample and hold circuit 504 holds the older value (this changes every time a new output signal 510 is sampled by one of the sample and hold circuits 502, 503). Mux element 514 then provides a respective output signal (gradient signal) 516 to mux element 518. The gradient signal 516 indicates whether the input power has been increased or decreased. Mux element 518 and the logic element 520 implement the tuning algorithm. For example, according to an embodiment, if the input power has decreased, the counter 522 including an accumulator (storage) 524, a summing point 526 and a feedback line 528 switches from counting up to counting down or the other way around. The counter is triggered by the clock clk3. The demux element 530 provides, in response to the output 532 of the counter 522, a control signal 534 for controlling the imaginary part and a control signal 536 for controlling the real part of the input impedance. The real part and the imaginary part of the input impedance of the charge pump device may be changed as described above (capacitor bank and resistance R0). The control bit re_im is used to select between tuning the real part or the imaginary part of the input impedance of the charge pump. This implies that the tuning of the real part and the imaginary part is done sequentially. The self-tuning is triggered once the output of the main charge pump exceeds a certain threshold, and is turned off after a number of clock cycles which depends on the size and the initial value of the capacitor bank. At the end of the self-tuning phase, the tag circuits are activated to start the communication with the reader.

Figure 15:
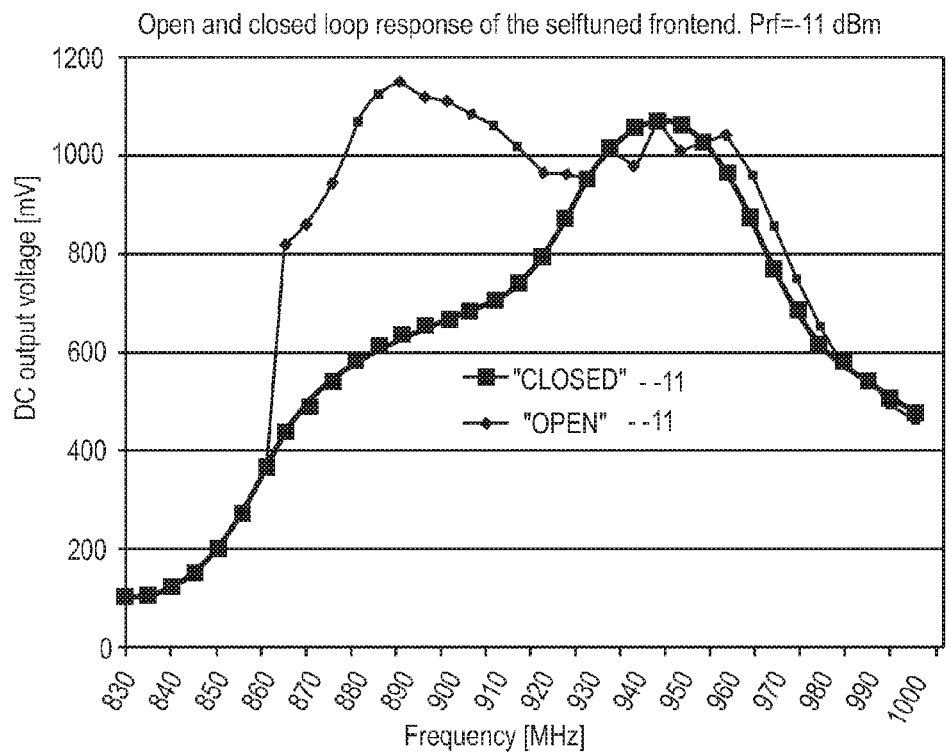
FIG. 15 shows the measured DC output voltage of a charge pump according to embodiments of the herein disclosed subject matter with and without self-tuning.
Figure 16:
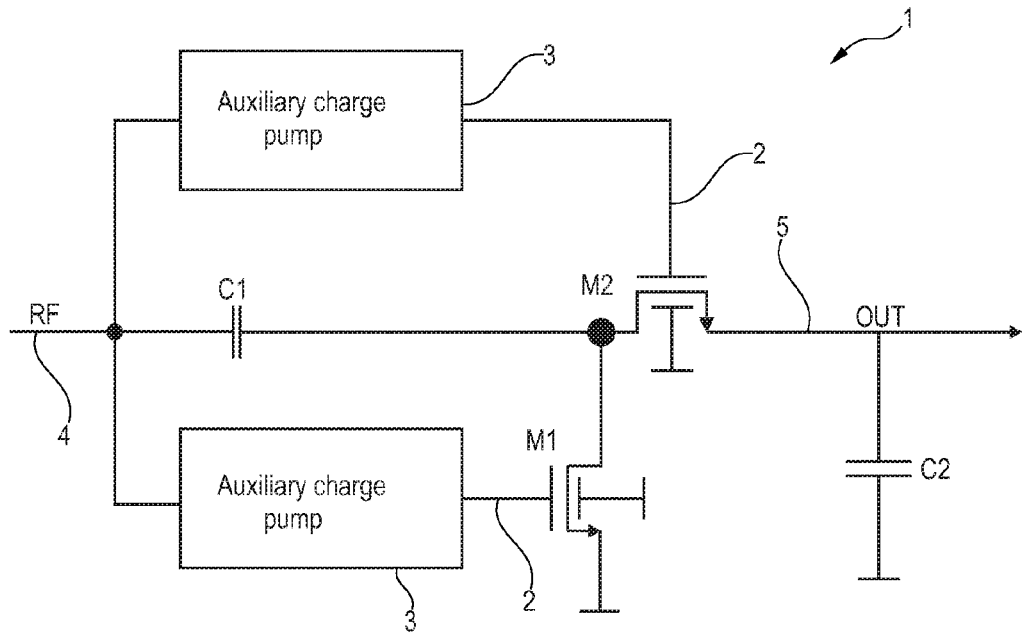
FIG. 16 shows a known one-stage charge pump.

FIG. 15 shows the measured DC output voltage of a charge pump with the self-tuning in open and closed loop modes. The self-tuning, i.e. the close loop mode, allows to extend the −3 dB bandwidth of the high-Q charge pump by a factor 2. In the open loop mode, the capacitor bank is turned off, while in the closed loop mode, the value of the capacitor bank is controlled via the state machine of FIG. 14.

According to embodiments of the invention, any suitable component of the charge pump device may be provided in the form of respective computer program products which enable a processor to provide the functionality of the respective elements as disclosed herein. According to other embodiments, any component may be provided in hardware. According to other—mixed—embodiments, some components may be provided in software while other components are provided in hardware. Further, it should be noted that a separate component (e.g. circuit) may be provided for each of the functions disclosed herein. According to other embodiments, at least one component (e.g. a circuit) is configured for providing two or more functions as disclosed herein.

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

In order to recapitulate the above described embodiments of the present invention one can state:

A high efficiency rectification stage is provided using dynamic threshold MOSFET. The idea is to use the input signal to reduce the threshold voltage when the transistor has to be on, and to increase the threshold when the transistor has to be off. This allows reducing both the resistive losses and the leakage current. A matching network allows the generation of a second higher voltage signal to drive the control gates and the bulk (i.e. the wells) of the transistors. Further, a self-tuned front-end is provided to extend the bandwidth of the high-Q charge pump.

LIST OF REFERENCE SIGNS 1 one stage charge pump
2 bias voltage
3 auxiliary charge pump
4 AC input
5 DC output
100 FET rectifier
102 AC input
104 DC output
200 charge pump device
201 clipping device
202 main charge pump
204 first auxiliary charge pump
206 second auxiliary charge pump
208 third auxiliary charge pump
210 bias generator
212 shorting device
300 matching circuit
302 power input
304 first matching circuit output
306 second matching circuit output
308 RFID front-end
310 capacitor
312 capacitor
314 ground
316 output terminal
318 output terminal
320 antenna
400 integrated circuit
402 envelope detector
404 state machine
406 capacitor bank
408, 410, 410 tag circuits
502 sample and hold circuit
504 sample and hold circuit
506 comparator
508 clock generator
510 output signals of the envelope detector
512 output signal of comparator
514 mux element
516 output signal of mux element 514
518 mux element
520 logic element
522 counter
524 accumulator
526 summing point
528 feedback line
530 demux element
532 output of counter
534 control signal for imaginary part of the input impedance of the charge pump device
536 control signal for real part of the input impedance of the charge pump device
M1, M3 FET transistors
BM1, BM3 bulk of M1, M3
L0 first matching coil
L1 second matching coil
C1 capacitance provided by 406

The invention claimed is:

1. A rectifier, comprising:
an AC input for receiving an AC input signal;
a DC output;
at least one transistor for providing a rectified output signal to the DC output, the transistor being a field effect transistor;
a threshold changing circuit coupled to a bulk of the transistor, the threshold changing circuit being adapted for electrically biasing the bulk of the transistor depending on the AC input signal to thereby change a voltage threshold of the transistor depending on the AC input signal; and
a matching circuit, the matching circuit having
a power input for receiving input power;
a first matching circuit output coupled to the AC input, the first matching circuit output providing, in response to the received input power, a first voltage; and
a second matching circuit output coupled to at least one of a gate of the transistor and the bulk of the transistor, the second matching circuit output providing, in response to the received input power, a second voltage;
the matching circuit being configured such that a magnitude of the second voltage is higher than a magnitude of the first voltage.

2. Rectifier according to claim 1, wherein the threshold changing circuit is configured to set the voltage threshold of the transistor to a low value in case the transistor has to be on and to set the voltage threshold of the transistor to a high value in case the transistor has to be off.

3. Rectifier according to claim 1, the matching circuit further comprising:
a first matching coil coupled between the power input and the AC input;
a second matching coil coupled to the AC input and providing the second voltage;
the first matching coil and the second matching coil being located with respect to each other such that an electromagnetic field produced by the first matching coil couples to the second matching coil to thereby increase the second voltage at the second matching circuit output compared to the first voltage at the first matching circuit output.

4. Rectifier according claim 1, further comprising a switching element coupled between the first matching circuit output and the second matching circuit output for selectively electrically connecting the first matching circuit output and the second matching circuit output.

5. A charge pump device, comprising
at least one rectifier according to claim 1.

6. Charge pump device according to claim 5, further comprising:
a variable capacitance unit for providing a capacitance tuning an imaginary part of an input impedance of the charge pump device.

7. Charge pump device according to claim 6, further comprising:
a tuning circuit for tuning the capacitance provided by the variable capacitance unit to a value that provides a maximum input power to the charge pump device.

8. Wireless identification device (RFID-device) comprising the charge pump device according to claim 5.

9. A method of operating a charge pump device comprising a rectifier with a transistor in the form of a field effect transistor, the method comprising:
- electrically biasing a bulk of the transistor depending on an AC input signal to the rectifier to thereby change a voltage threshold of the transistor depending on the AC input signal;
- providing a first voltage to be switched by the transistor to a source/drain of the transistor;
- providing a second voltage, which is higher than the first voltage, to at least one of a gate of the transistor and the bulk of the transistor.

10. Method according to claim 9, further comprising:
- tuning at least an imaginary part of an input impedance of the charge pump device so as to provide a maximum output voltage of the charge pump.

\* \* \* \* \*